(12) United States Patent
Dohi et al.

(10) Patent No.: US 6,921,784 B2
(45) Date of Patent: Jul. 26, 2005

(54) POLYCARBONATE-BASED MOLDING MATERIAL AND OPTICAL DISK SUBSTRATES

(75) Inventors: Yutaka Dohi, Chiyoda-ku (JP); Masaki Shiomi, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/399,962

(22) PCT Filed: Jul. 24, 2002

(86) PCT No.: PCT/JP02/07499

§ 371 (c)(1),
(2), (4) Date: Jul. 2, 2003

(87) PCT Pub. No.: WO03/010236

PCT Pub. Date: Feb. 6, 2003

(65) Prior Publication Data

US 2004/0014851 A1 Jan. 22, 2004

(30) Foreign Application Priority Data

Jul. 27, 2001 (JP) ........................................ 2001-227408
Jul. 27, 2001 (JP) ........................................ 2001-227409

(51) Int. Cl.[7] ........................ C08K 5/523; C08K 5/526; C08K 5/101
(52) U.S. Cl. ........................ 524/117; 524/140; 524/147; 524/306; 524/311; 524/312; 524/313; 524/314; 524/315; 524/318; 524/321; 524/322; 525/351
(58) Field of Search ................................ 524/117, 140, 524/147, 306, 311–315, 318, 321–322; 523/351

(56) References Cited

U.S. PATENT DOCUMENTS 6,001,953 A * 12/1999 Davis et al. ................. 528/196
6,596,198 B1 * 7/2003 Semen ................... 252/400.24

FOREIGN PATENT DOCUMENTS

| JP | 61-287954 | 12/1986 |
| JP | 10-60120 | 3/1998 |
| JP | 10-60247 | 3/1998 |

* cited by examiner

Primary Examiner—Peter Szekely
(74) Attorney, Agent, or Firm—Wenderoth, Lind & Ponack, L.L.P.

(57) ABSTRACT

A polycarbonate resin molding material containing (A) 100 parts by weight of a polycarbonate resin and 0.001 to 1.0 part by weight of a mold release agent (B) which is composed of a fatty acid ester and a phosphorus-containing heat stabilizer and contains 0.0001 to 50 parts by weight, per 100 parts by weight of the fatty acid ester (b1), of the phosphorus-containing heat stabilizer (b2).

The present invention provides a polycarbonate resin molding material excellent in mold releasability and heat resistance during molding, and a molded article therefrom. According to the present invention, particularly, there is provided a polycarbonate resin molding material excellent in mold releasability and thermal stability during molding and suitable for producing a optical disk by incorporating a small amount of a mold release agent and a heat stabilizer.

20 Claims, No Drawings

POLYCARBONATE-BASED MOLDING MATERIAL AND OPTICAL DISK SUBSTRATES

DETAILED DESCRIPTION OF THE INVENTION

1. Field of the Invention

The present invention relates to a polycarbonate resin composition that is improved in heat resistance during molding while retaining good mold releasability and a molded article produced therefrom. More specifically, it relates to an optical disk substrate and a polycarbonate resin molding material that is excellent in moldability, thermal stability and hydrolysis resistance at high temperatures while retaining good mold releasability and which is suitable for an optical use, particularly for an optical disk substrate highly reliable for use for a long time.

2. Prior Art

Of polymer materials, a polycarbonate resin is a material having relatively superior heat resistance. With increasing demands for higher functions and higher performances of materials, a variety of additives have come to be used. With an increase in the amount of an additive, generally, the heat resistance of the resin tends to decrease.

A polycarbonate resin is widely used for an optical disk substrate due to its excellent heat resistance and transparency. As an optical disk for recording and reproducing information by the application of a laser beam, conventionally, a digital audio disk (a so-called compact disk), an optical video disk (so-called laser disk), write-once-recording disks of various types, a magneto-optical disk, a phase change recording disk, and the like are practically used.

Of these, a compact disk and a laser disk are optical disks of a reproduction use only (read only memory: ROM) type. In these optical disks, pits corresponding to information signals are formed in a convexoconcave shape on a transparent substrate, and an Al (aluminum) reflection layer having a thickness of 40 nm or more is formed thereon. In such an optical disk, a reflectance change caused in a pit by optical interference is detected to reproduce an information signal.

A write-once-record-many optical disk is an R (recordable) type disk in which a user can write information as he or she wishes. A magneto-optical disk and a phase change recording disk are optical disks of a RAM (random access memory) type in which any information can be written repetitively.

That is, the R type optical disk is constituted of a transparent substrate and a write-once-recording recording type layer whose optical properties are irreversibly changed, or on which a convexoconcave shape is formed, by heating due to the application of a laser beam, the write-once-recording recording layer being formed on the substrate. The above recording layer uses a cyanine-, phthalocyanine- or azo-containing organic dyestuff which is decomposed by the application of a laser beam to have its optical constant changed and which undergoes a volume change to cause the substrate to deform.

A magneto-optical disk is a rewritable disk in which a user can repeatedly write and delete information, and it is constituted of a transparent substrate and a perpendicular magnetic film formed thereon, the perpendicular magnetic film having a magneto-optic effect (e.g., Kerr effect) such as Tb—Fe—Co amorphous alloy thin film. In the magneto-optical disk, a micro-region of the perpendicular magnetic film is magnetized upwardly or downwardly depending upon an information signal, to form a record pit. And, the rotation angle θk (Kerr rotation angle) of linear polarized light in reflection light differs depending upon the direction of magnetization of the perpendicular magnetic film, and the above difference is used to reproduce the information signal.

The phase change recording disk is a rewritable disk like this magneto-optical disk, and it uses, for example, a Ge—Sb—Te phase change material, or the like, which shows a crystal state at an initial stage and undergoes a phase change to an amorphous state by the application of a laser beam. In the recording layer thereof, a micro-region is caused to have a phase change depending upon an information signal, to form a pit, and a reflection difference between the amorphous portion corresponding to the pit and a crystal region different form the amorphous portion is detected to reproduce the information signal.

For preventing the oxidation of the recording layer or increasing the signal modulation factor by multiple interference, the above magneto-optical disk or the phase change recording disk often has a four-layered structure in which the recording layer is sandwiched between transparent dielectric material layer and an Al reflection layer is laminated thereon. As a dielectric material layer, a silicon nitride layer, a Zn—$SiO_2$ layer, or the like is employed.

Meanwhile, such optical disks are being actively studied recently for applying them to the digital versatile disk (DVD) has been developed.

Although having a diameter of 120 mm like CD, the above DVD is capable of recording image information corresponding to a volume of one movie and is capable of reproduction in image quality like a current TV.

For recording image information in an optical disk, the optical disk is required to have a storage capacity that is 6 times to 8 times the capacity of CD. In DVD, therefore, the laser wavelength is decreased to 635 to 650 nm in contrast with a laser wavelength of 780 nm for CD, and the numerical aperture NA of an object lens is increased to 0.52 or 0.6 in contrast with a numerical aperture of 0.45 for CD, whereby the minimum recording mark length of a truck pitch a pit is decreased in order to increase the recording density.

The above increase in the numerical aperture of an object lens means that the tolerance for distortion of a disk substrate is decreased. The substrate thickness of DVD is therefore decreased to 0.6 mm in contrast with CD having a substrate thickness of 1.2 mm, so that the distance through which a laser beam passes is decreased in order to offset the decreased allowance for distortion (Nikkei Electronics, Feb. 27, 1995, No. 630). For offsetting a decrease in the disk strength caused by further decreasing the thickness of the substrate, there is employed a so-called bonded structure in which a substrate is further bonded on a recording layer formed on a substrate, as is disclosed in JP-A-6-274940. As a recording layer of the bonded optical disk, any one of a ROM type recording layer, an R type recording layer and a RAM type recording layer can be used for the above single-substrate structure.

Further, the bonded optical disk includes a single-sided bonded optical disk whose one surface alone is used and a double-sided bonded optical disk whose double surfaces are used.

For the above optical disk substrate, a polycarbonate resin excellent in moldability, strength, light transmittance and moisture resistance is mostly used.

Problems to be Solved by the Invention

In the above optical use, it constitutes essential property requirements that the optical strain is low and that the transferability for forming pits is good. For obtaining a molded article having a low birefringence and good transferability, a resin is required to have excellent flowability and mold releasability during molding.

For attaining excellent flowability during molding, it is general practice in the optical use field to use a polycarbonate resin having a viscosity average molecular weight of approximately 22,000. However, the resin temperature during molding is required to be a high temperature, as high as 310 to 400° C., and a decrease in molecular weight is liable to occur due to depolymerization, and coloring is liable to occur due to thermal deterioration. The polycarbonate resin is therefore required to have excellent heat resistance.

Meanwhile, it is general practice to incorporate a mold release agent to a polycarbonate resin beforehand for improving the polycarbonate resin in mold releasability. As a mold release used agent for the above purpose, an ester of an alcohol and a fatty acid is well known. When a mold release agent is incorporated into the resin for improving the resin in mold releasability, it is desirable to incorporate a large amount of the mold release agent in view of an improvement in mold releasability. However, when a large amount of the mold release agent is incorporated, there is caused a problem that the thermal stability of the resin is deteriorated to color a molded article.

Conventionally, attempts have been made to incorporate a variety of compounds as a method of improving a polycarbonate resin in thermal stability. Such compounds generally include phosphorus-containing thermal stabilizers, particularly, phosphorous acid esters such as triphenyl phosphate and tricresyl phosphate. The above phosphorous acid esters have a considerably high vapor pressure at a temperature at which a polycarbonate resin is processed. When such a phosphorus acid ester is used in an amount adequate for imparting the resin with sufficient thermal stability, therefore, there is caused a problem that a molded article obtained is liable to include gas bubbles or to have silver streaks. As a technique for overcoming the above problem, there is proposed a resin composition prepared by incorporating a polyhydric alcohol fatty acid partial ester and a phosphorous acid ester into a polycarbonate resin (JP-B-1-23498).

On the other hand, a polycarbonate resin has a defect that since it is easily hydrolyzed at high temperatures under high humidity, a molded article therefrom is liable to suffer a decrease in molecular weight or impact strength. Further, when allowed to stand at high temperatures under high humidity for a long period of time, a polycarbonate resin has a defect that fine white spots occur substrate formed thereof and impairs the long-term reliability. Further, another defect is that an impurity contained in a polycarbonate resin corrodes a recording layer formed on a disk substrate of the above optical disk or magnetic disk, whereby the long-term reliability of the disk substrate is impaired. Therefore, a composition for optical use has been proposed, in which the composition is improved in its hydrolysis property by incorporating phosphorus acid (JP-A-10-60247).

As described already, with a recent increase in the recording capacity of an optical disk, a substrate having long-term reliability in addition to high transferability and low birefringence has come to be demanded, and the above proposed composition has no longer satisfied the thermal stability against molding at high temperatures and the long-term reliability together while retaining excellent mold releasability.

Means to Solve the Problems

The present invention has been made in view of the above problems. The present inventors have made diligent studies with regard to the above problems, and as a result, the following has been found. When a fatty acid ester is used as an internal mold release agent, and further, when a phosphorus-containing heat stabilizer is used, the phosphorus-containing heat stabilizer is added to the fatty acid ester that is melted in advance, and the thus-obtained mold release agent is added to a polycarbonate resin. In this case, there can be obtained a polycarbonate resin composition having excellent heat resistance during molding while retaining excellent mold releasability as compared with a case where the above agents are separately added to a polycarbonate resin, and that a molded article formed of the above polycarbonate resin can maintain high reliability for a long period of time. The reason for the above outcome is not clear. However, it is assumed that the phosphorus-containing heat stabilizer neutralizes a residual alkali component used for esterification during the preparation of the mold release agent and therefore suppresses the pyrolysis and hydrolysis of the polycarbonate resin, or that the heat stabilizer itself suppresses the pyrolysis and hydrolysis of the mold release agent. Further, it is assumed that since these two additives are mixed beforehand, the mold release agent and the stabilizer are present close to each other in the polycarbonate resin, so that the stabilizing effect thereof is enhanced.

That is, according to the present invention, there are provided the following polycarbonate resin molding materials (1) to (14) and molded articles formed therefrom.

(1) A polycarbonate resin molding material for optical use, comprising 100 parts by weight of a polycarbonate resin (A) and 0.001 to 1.0 part by weight of a mold release agent (B) composed of a fatty acid ester and a phosphorus-containing heat stabilizer, the mold release agent (B) containing 0.0001 to 10 parts by weight, per 100 parts by weight of the fatty acid ester (b1), of the phosphorus-containing heat stabilizer (b2).

(2) The polycarbonate resin molding material for optical use as recited in (1), wherein the polycarbonate resin is a polycarbonate resin having a viscosity average molecular weight of 10,000 to 50,000.

(3) The polycarbonate resin molding material for optical use as recited in (1), wherein the fatty acid ester (b1) is a partial ester or a whole ester of a monohydric alcohol and/or a polyhydric alcohol and a fatty acid, represented by the following formula (1),

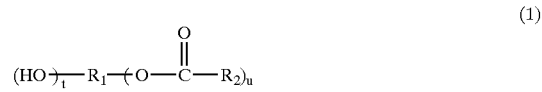

wherein $R_1$ is an aliphatic hydrocarbon group having a valance of (t+u) and having 1 to 22 carbon atoms, $R_2$ is an alkyl group having 12 to 22 carbon atoms, t is 0 or a positive integer, and u is a positive integer, provided that (t+u) is an integer of 1 to 6, preferably 1 to 4.

(4) The polycarbonate resin molding material for optical use as recited in (1), wherein the phosphorus-containing heat stabilizer (b2) is at least one selected from the group consisting of phosphoric acid, a phosphorous acid, esters of these and condensates of these.

(5) The polycarbonate resin molding material for optical use as recited in (1), wherein the phosphorus-containing heat stabilizer (b2) is at least one selected from the group consisting of compounds represented by the following formulae (2) to (6),

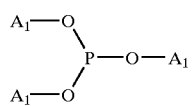  (2)

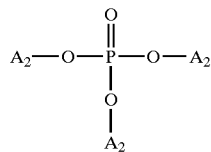  (3)

$H_{q+2}P_qO_{3q+1}$  (4)

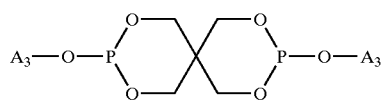  (5)

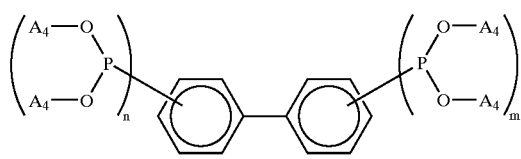  (6)

wherein each of a plurality of $A_1$s, each of a plurality of $A_2$s, each of a plurality of $A_3$s or each of a plurality of $A_4$ is independently a group selected from the class consisting of an alkyl group having 1 to 20 carbon atoms, a phenyl group, a phenylalkyl group (whose alkyl portion has 1 to 9 carbon atoms) and an alkylphenyl group (whose alkyl portion has 1 to 9 carbon atoms), each of $A_1$s or each of $A_2$s can be independently a hydrogen atom, q in the formula (4) is an integer of 2 to 6, and each of m and n in the formula (6) is independently an integer of 0 to 2, provided that (m+n) is 1 or 2.

(6) The polycarbonate resin molding material for optical use as recited in (1), wherein the mold release agent (B) is constituted from by homogeneously mixing of the fatty acid ester (b1) and the phosphorus-containing heat stabilizer (b2).

(7) The polycarbonate resin molding material for optical use as recited in (1), wherein the mold release agent (B) is a product composed by mixing the fatty acid ester (b1) and the phosphorus-containing heat stabilizer (b2) under a condition where at least one component of these is melted.

(8) The polycarbonate resin molding material for optical use as recited in (1), wherein the mold release agent (B) contains 0.5 to 10 mol % of a free monohydric alcohol and/or a free polyhydric alcohol per 100 mol % of the monohydric alcohol and/or the polyhydric alcohol forming the fatty acid ester (b1).

(9) The polycarbonate resin molding material for optical use as recited in (1), wherein the fatty acid ester (b1) is an ester formed from a polyhydric alcohol having 3 or 4 hydroxyl groups and having 3 to 5 carbon atoms and an aliphatic monocarboxylic acid having 14 to 20 carbon atoms.

(10) The polycarbonate resin molding material for optical use as recited in (1), wherein the fatty acid ester (b1) is mono- or diester of glycerin and stearic acid or palmitic acid or a whole ester of pentaerythritol and stearic acid or palmitic acid.

(11) The polycarbonate resin molding material for optical use as recited in (1), wherein the fatty acid ester (b1) is an ester of glycerin and stearic acid or palmitic acid, said ester being a mixture of a monoester and a diester, the mixture having a monoester:diester molar ratio of 99:1 to 90:10.

(12) The polycarbonate resin molding material for optical use as recited in (1), wherein the phosphorus-containing heat stabilizer (b2) is at least one selected from the group consisting of a mixture of tetrakis(2,4-di-tert-butylphenyl) 4,4'-biphenylene-di-phosphonite, tetrakis(2,4-di-tert-butylphenyl)4,3'-biphenylene-di-phosphonite and tetrakis(2,4-di-tert-butylphenyl)3,3'-biphenylene-di-phosphonite, phosphoric acid, phosphorous acid, trimethyl phosphate, (2,4-di-tert-butylphenyl)phosphite and trisnonylphenyl phosphite.

(13) The polycarbonate resin molding material for optical use as recited in (1), which contains, per 100 parts by weight of the polycarbonate resin, 0.01 to 0.6 part by weight of the mold release agent (B).

(14) The polycarbonate resin molding material for optical use as recited in (1), wherein the mold release agent (B) contains, per 100 parts by weight of the fatty acid ester (b1), 0.005 to 3 parts by weight of the phosphorus-containing heat stabilizer (b2).

The polycarbonate resin molding material of the present invention and the method of preparing the same will be explained in detail hereinafter.

The polycarbonate resin molding material of the present invention has a characteristic feature in a constitution in which the fatty acid ester (b1) and the phosphorus-containing heat stabilizer (b2) are mixed prior to adding them into the polycarbonate resin.

Further, the above technique has advantages that a constant amount of the phosphorus-containing heat stabilizer can be added to the fatty acid ester, and that a very small amount of the phosphorus-containing heat stabilizer can be added to the polycarbonate resin, in the step of producing the polycarbonate resin molding material, and further, it also has an advantage that the step can be simplified.

The fatty acid ester (b1) for constituting the mold release agent in the present invention is that which is incorporated into a resin molding material for improving an optical disk substrate in releasability from a mold in melt-molding. The fatty acid ester (b1) is the mold release agent which contains at least 90% by weight of a partial ester or whole ester from a monohydric alcohol and/or a polyhydric alcohol and a fatty acid. The fatty acid ester (b1) can be represented by the following formula (1).

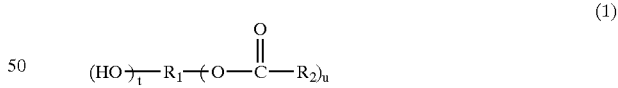  (1)

In the formula (1), $R_1$ is an aliphatic hydrocarbon group having a valence of (t+u) and having 1 to 22 carbon atoms, $R_2$ is an alkyl group having 12 to 22 carbon atoms, t is 0 or a positive integer, and u is a positive integer, while (t+u) is an integer of 1 to 6, preferably 1 to 4.

When the fatty acid ester (b1) is an ester from a monohydric alcohol and a saturated fatty acid, examples of the ester include stearyl stearate, palmityl palmitate, butyl stearate, methyl laurate and isopropyl palmitate, and stearyl stearate is preferred.

Further, when the fatty acid ester (b1) is a partial ester or whole ester from a polyhydric alcohol and a saturated fatty acid, examples of the partial ester or whole ester include glycerin monosterate, glycerin distearate, glycerin tristearate, glycerin monopalmitate, glycerin dipalmitate, glycerin tripalmitate, stearic acid monosorbitate, glycerin monobehenate, pentaerythritol monostearate, pentaerythritol tetrastearate, pentaerythritol tetrapalmitate, pentaerythritol tetrapelargonate, propylene glycol monostearate, biphenyl biphenate, sorbitan monostearate, 2-ethylhexyl stearate and a dipentaerythritol whole ester or partial ester such as dipentaerythritol hexastearate.

The fatty acid ester (b1) is preferably an ester formed from an alcohol having 3 or 4 hydroxyl groups and having 3 to 5 carbon atoms and an aliphatic monocarboxylic acid having 14 to 20 carbon atoms, and a monoester and/or diester formed from glycerin and stearic acid or palmitic acid is/are particularly preferred. A particularly preferably embodiment of the fatty acid ester (b1) is a mixture of a monoester and a diester formed from glycerin-and stearic acid or palmitic acid. The above mixture has desirably the monoester:diester molar ratio of 99:1 to 90:10.

Further, another preferred embodiment of the fatty acid ester (b) is (i) a mixture of a mono- or diester formed from glycerin and stearic acid with a mono- or diester formed from glycerin and palmitic acid or (ii) a mixture of a whole ester formed from pentaerythritol and stearic acid with a whole ester formed from pentaerythritol and palmitic acid. The above mixture preferably has the stearic acid ester-:palmitic acid ester ratio by weight of 75:25 to 50:50.

The acid value of the above fatty acid ester (b1) is preferably 3 or less, more preferably 2 or less. When the fatty acid ester (b1) is stearic acid monoglyceride, the stearic acid monoglyceride preferably has an acid value of 1.5 or less and a purity of at least 95% by weight, most preferably has an acid value of 1.2 or less and a purity of at least 98% by weight. The fatty acid ester can be measured for an acid value by a method that is known per se.

The amount of the mold release agent (B) composed of the above partial ester or whole ester (b1) from a monohydric and/or polyhydric alcohol(s) and a fatty acid and the phosphorus-containing heat stabilizer (b2) per 100 parts by weight of the polycarbonate resin is preferably 0.001 to 1.0 part by weight, more preferably 0.01 to 0.6 part by weight.

The phosphorus-containing heat stabilizer (b2) for use in the present invention is preferably, for example, at least one member selected from the group consisting of phosphoric acid, phosphoric acid ester, phosphorous acid, phosphorous acid ester and condensates of these.

The phosphorus-containing heat stabilizer is more preferably at least one compound selected from the group consisting of compounds represented by the following formulae (2) to (6).

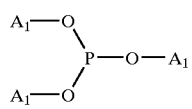

(2)

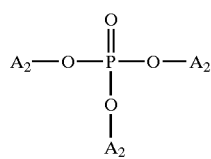

(3)

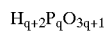

(4)

$H_{q+2}P_qO_{3q+1}$

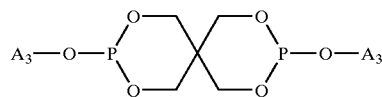

(5)

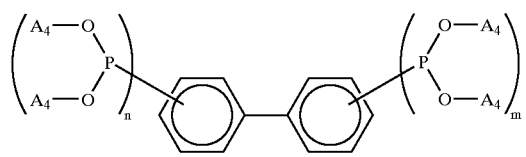

(6)

wherein each of a plurality of $A_1$s, each of a plurality of $A_2$s, each of a plurality of $A_3$s or each of a plurality of $A_4$s is independently a group selected from the class consisting of an alkyl group having 1 to 20 carbon atoms, a phenyl group, a phenylalkyl group (whose alkyl portion has 1 to 9 carbon atoms) and an alkylphenyl group (whose alkyl portion has 1 to 9 carbon atoms), each of $A_1$s or each of $A_2$s can be independently a hydrogen atom, q in the formula (4) is an integer of 2 to 6, and each of m and n in the formula (6) is independently an integer of 0 to 2, provided that (m+n) is 1 or 2.

The phosphorus-containing heat stabilizers (b2) represented by the above formulae (2) to (6) specifically include phosphorous acid, phosphoric acid, esters of these and condensates of these. More specific examples of these include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis (4,6-di-tert-butylphenyl)octyl phosphite, bis(nonylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate and triphosphoric acid. Of these, phosphoric acid, phosphorous acid, trimethyl phosphate, tris(2,4-di-tert-butylphenyl)phosphite, tetrakis(2,4-di-tert-butylphenyl)4,4'-biphenylen-diphosphonite and tris-nonylphenyl phosphite are preferred. These compounds may be used alone or in combination of two or more.

The amount of the phosphorus-containing heat stabilizer (b2) for use in the present invention per 100 parts by weight of the fatty acid ester (b1) is in the range of 0.0001 to 10 parts by weight, more preferably in the range of 0.001 to 5 parts by weight, more preferably in the range of 0.005 to 3 parts by weight.

The preparation of the mold release agent (B) composed of the phosphorus-containing heat stabilizer (b2) and the fatty acid ester (b1) can be carried out by any mixing method, and these components may be mixed in any order. Particularly, a method in which the phosphorus-containing heat stabilizer (b2) is mixed with the fatty acid ester (b1) that is melted is the most preferred method. Above all, the most suitable and essential point for achieving the effect of the present invention is that the phosphorus-containing heat stabilizer (b2) is mixed with the fatty acid ester (b1) that is melted in advance and homogeneously mixed, prior to adding them to the polycarbonate resin.

While the method of preparing the polycarbonate resin (A) for use in the present invention is not specially limited, the polycarbonate resin (A) can be obtained, for example, by reacting a dihydric phenol and/or an aliphatic diol and a carbonate precursor according to an interfacial polymerization method (solution polymerization method) or a melt polymerization method. Typical examples of the above dihydric phenol include 2,2-bis(4-hydroxyphenyl)propane (so-called bisphenol A), bis(4-hydroxyphenyl)methane, 1,1-bis(4-hydroxyphenyl)ethane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl)ether, 4,4-dihydroxydiphenyl, bis(4-hydroxyphenyl)sulfide and bis(4-hydroxyphenyl)sulfone. Typical examples of the aliphatic diol include ethylene glycol, 1,2-propanediol, 1,3-butanediol, cyclobutanediol, cyclopentanediol, cyclohexanediol, neopentyl glycol, cyclohexanedimethanol, 2,2-bis(4-hydroxycyclohexyl)propane, bicyclohexyl-4,4'-diol, tricyclo[5,2,1,0$^{2,6}$]decanedimethanol, 3,9-bis(2-hydroxy-1,1-dimethylethyl)-2,4,8,10-tetraoxaspiro(5,5)undecane, decalindimethanol, norbornanedimethanol and pentacyclopentadecanedimethanol. Preferred are bis(4-hydroxyphenyl)alkanes, and of these, bisphenol A is particularly preferred.

The carbonate precursor is selected from carbonyl halide, carbonate ester or haloformate, and specifically, it is selected from phosgene, diphenyl carbonate or dihaloformate of a dihydric phenol.

When the above dihydric phenol (and/or the above aliphatic diol) and the above carbonate precursor are reacted, for example, according to an interfacial polymerization method or a melt polymerization method, to prepare the polycarbonate resin, the above dihydric phenols and/or the above aliphatic diols may be used alone or in combination of two or more, and a catalyst, a terminal stopper and an antioxidant for the dihydric phenol may be used as required. Further, the polycarbonate resin (A) may be a branched polycarbonate resin prepared by copolymerization of a trifunctional or higher polyfunctional compound. Further, the polycarbonate resin (A) may be a mixture of two or more polycarbonate resins.

The reaction according to an interfacial polymerization method is generally a reaction between a dihydric phenol and/or an aliphatic diol and phosgene, and these components are allowed to react in the presence of an acid binder and an organic solvent. The acid binder is selected, for example, from alkali metal hydroxides such as sodium hydroxide and potassium hydroxide or amine compounds such as pyridine. The above organic solvent is selected, for example, from halogenated hydrocarbons such as methylene chloride and chlorobenzene. For promoting the above reaction, a catalyst such as a tertiary amine or a quaternary ammonium salt may be used. In the above reaction, generally, the reaction temperature is 0 to 40° C., and the reaction time period is several minutes to approximately 5 hours.

The reaction according to a melt polymerization method is generally an ester exchange reaction between the dihydric phenol (and/or the aliphatic diol) and a diaryl carbonate, and the dihydric phenol and/or the aliphatic diol and the diaryl carbonate are mixed in the presence of an inert gas and the mixture is allowed to react under reduced pressure generally at a temperature of 120 to 350° C. The pressure reduction degree is stepwise changed, and the pressure is finally reduced to 1 mmHg or lower, to remove formed phenols out of the system. The reaction time period is generally approximately 1 to 4 hours.

In the polymerization reaction, monohydric phenols may be used as a terminal stopper. Particularly when phosgene is used as a carbonate precursor, monohydric phenols are used as a terminal stopper for adjusting the molecular weight of the polycarbonate resin. Further, the thus-obtained polycarbonate resin is excellent in thermal stability as compared with a polycarbonate resin obtained otherwise, since terminals thereof are blocked with groups derived from the monohydric phenols.

The above monohydric phenols include monohydric phenols represented by the following general formulae (7) to (9).

(7)

wherein B is a hydrogen atom, an alkyl group having 1 to 9 carbon atoms or a phenylalkyl group (whose alkyl portion has 1 to 9 carbon atoms), and r is an integer of 1 to 5, preferably 1 to 3.

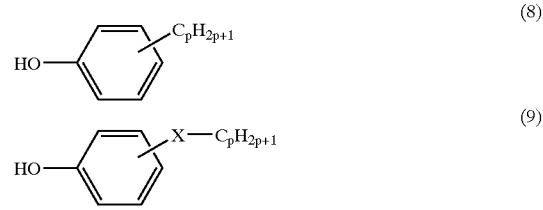

(8)

(9)

In these formulae, X is —R—CO—O— or —R—O—CO—, in which R is a single bond or a divalent aliphatic hydrocarbon group having 1 to 10 carbon atoms, preferably 1 to 5 carbon atoms, and p is an integer of 10 to 50.

Specific examples of the monohydric phenols represented by the above general formula (7) include isopropylphenol, p-tert-butylphenol, p-cresol, p-cumylphenol and isooctylphenol.

The monohydric phenols represented by the above general formulae (8) and (9) are phenols having a long-chain alkyl group or aliphatic ester group as a substituent. When terminals of the polycarbonate resin are blocked with these phenols, these phenols not only work as a terminal stopper or a molecular weight adjusting agent, but also they improve the resin in melt flowability, so that the molding is made easier. Further, they have an effect on the physical properties of the substrate, particularly an effect that the water absorptivity of the resin is decreased, and they also have an effect that the birefringence of the substrate is decreased, so that their use is desirable.

As substituted phenols of the above general formula (8), phenols of the general formula (8) in which p is 10 to 30 are preferred, and phenols of the general formula (8) in which p is 10 to 26 are particularly preferred. Specific examples of the phenols include decylphenol, dodecylphenol, tetradecylphenol, hexadecylphenol, octadecylphenol, eicosylphenol, docosylphenol and triacontylphenol.

As substituted phenols of the above general formula (9), preferred are phenols of the general formula (9) in which X is —R—CO—O— and R is a single bond, and such phenols of the general formula (9) in which p is 10 to 30, particularly 10 to 26 are preferred. Specific examples of such phenols include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

Of these monohydric phenols, monohydric phenols of the above general formula (7) are preferred, such phenols on which an alkyl or a phenylalkyl is substituted are more preferred, and p-tert-butylphenol or p-cumylphenol is particularly preferred.

The amount of these monohydric phenols as a terminal stopper introduced into terminals of the obtained polycarbonate resin, based on the total amount of terminals of the polycarbonate resin, is at least 5 mol %, preferably at least 10 mol %. These terminal stoppers may be used alone, or in combination as a mixture of at least two types of monohydric phenols.

While the molecular weight of the polycarbonate resin (component A) in the present invention is not specially limited, the molecular weight thereof, as a viscosity average molecular weight (M), is properly 10,000 to 50,000. The viscosity average molecular weight (M) that is preferred differs depending upon the fields of use of the polycarbonate resin. The molecular weight, as a viscosity average molecular weight (M), of the polycarbonate resin suitable for an optical disk is preferably 10,000 to 22,000, more preferably 12,000 to 20,000, particularly preferably 13,000 to 18,000. The polycarbonate resin having the above viscosity average molecular weight is preferred, since it gives sufficient strength as a material for an optical use, has excellent melt flowability during molding and causes no distortion caused by molding.

The molecular weight, as a viscosity average molecular weight (M), of the polycarbonate resin suitable for general molded articles other than the optical disk is preferably 14,000 to 35,000.

The viscosity average molecular weight to which the present invention refers is determined by inserting a specific viscosity ($\eta_{sp}$) obtained from a solution of 0.7 g of a polycarbonate resin in 100 mL of methylene chloride at 20° C. into the following equation.

$\eta_{sp}/c=[\eta]+0.45\times[\eta]^2 c$ (in which [$\eta$] is an intrinsic viscosity.)

$[\eta]=1.23\times10^{-4}M^{0.83}$ $c=0.7$

For preventing a decrease in the molecular weight and the deterioration of a hue during molding, the same phosphorus-containing heat stabilizer as that in the present invention may be additionally used for the polycarbonate resin molding material according to an incorporation method that is different from the method in which the above phosphorus-containing heat stabilizer of the present invention is used as an internal mold release agent. Such additional phosphorus-containing heat stabilizers may be used alone or in combination of two or more.

The amount of the above additional heat stabilizer per 100 parts by weight of the polycarbonate resin is preferably 0.0001 to 0.15 part by weight, more preferably 0.0005 to 0.10 part by weight, still more preferably 0.001 to 0.05 part by weight.

For preventing oxidation, the polycarbonate resin molding material of the present invention may contain a generally known antioxidant. Examples of the above antioxidant includes pentaerythritoltetrakis(3-merocaptopropionate), pentaerythritoltetrakis(3-laurylthiopropionate), glycerol-3-stearylthiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate, tetrakis(2,4-di-tert-butylphenyl)4,4'-biphenylenediphosphinate, 3,9-bis{1,1-dimethyl-2-[β-(3-tert-butyl-4-hydroxy-5-methylphenyl)propionyloxy]ethyl}-2,4,8,10-tetraoxaspiro(5,5)undecane. The amount of the above antioxidant per 100 parts by weight of the polycarbonate resin is preferably 0.001 to 0.05 part by weight.

The polycarbonate resin molding material of the present invention may contain an ultraviolet absorbent. Specifically, the ultraviolet absorbent compound include benzophenone compounds such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydride benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone, and benzotriazole compounds such as 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzooxazin-4-one) and 2-[2-hydroxy-3-(3,4,5,6-tetrahydrophthalimidomethyl)-5-methylphenyl]benzotriazole. These ultraviolet absorbents may be used alone or in combination of two or more.

The polycarbonate resin molding material of the present invention may contain an antistatic agent. Examples of the antistatic agent include polyetheresteramide, glycerin monostearate, dodecylbenzenesulfonic acid ammonium salt, dodecylbenzenesulfonic acid phosphonium salt, maleic anhydride monoglyceride, maleic anhydride diglyceride, carbon, graphite and a metal powder. The amount of the above antistatic agent per 100 parts by weight of the polycarbonate resin molding material is preferably 0.1 to 10 parts by weight.

The resin molding material of the present invention may contain a bluing agent so long as the object of the present invention is not impaired. The bluing agent is effective for offsetting the yellowish tinge of the resin molding material. In reality, a molding material imparted particularly with weatherability contains a certain amount of an ultraviolet absorbent, so that a molded resin article therefrom is liable to show a yellowish tinge due to "function and color of the ultraviolet absorbent". For imparting a sheet product or a lens product particularly with natural transparency, it is very effective to incorporate a bluing agent.

In the present invention, the amount of the bluing agent based on the entire resin molding material is 0.05 to 1.5 ppm, preferably 0.1 to 1.2 ppm. When the amount of the bluing agent is too large, the bluish color of a resin product is intensified, and the visual transparency thereof decreases.

Typical examples of the bluing agent include Macrolex Violet and Triazole Blue-RLS supplied by Ciba Specialty Chemicals, while the bluing agent shall not be limited thereto.

The polycarbonate resin molding material of the present invention may contain a flame retardant in such an amount that the object of the present invention is not impaired. The flame retardant includes a polycarbonate type flame retardant of halogenated bisphenol A, an organic salt-containing flame retardant, an aromatic-phosphoric-ester-containing flame retardant and a halogenated-aromatic-phosphoric-ester-containing flame retardant, and at least one of these flame retardants may be incorporated. Specifically, the polycarbonate type flame retardant of halogenated bisphenol A includes a polycarbonate type flame retardant of tetrabromobisphenol A and a copolycarbonate type flame retardant of tetrabromobisphenol A and bisphenol A. Specifically, the organic-salt-containing flame retardant includes dipotassium diphenylsulfone-3,3'-disulfonate, potassium diphenylsulfone-3-sulfonate, sodium 2,4,5-trichlorobenzenesulfonate, potassium 2,4,5-trichlorobenzenesulfonate, potassium bis(2,6-diboromo-4-cumylphenyl)phosphate, sodium bis(4-cumylphenyl) phosphate, potassium bis(p-toluenesulfone)imide, potassium bis(diphenylphosphate)imide, potassium bis(2,4,6-tribromophenyl)phosphate, potassium bis(2,4-dibromophenyl)phosphate, potassium bis(4-bromophenyl) phosphate, potassium diphenylphosphate, sodium diphenylphosphate, potassium perfluorobutanesulfonate, sodium or potassium laurylsulfonate and sodium or potassium hexadecylsulfate. Specifically, the halogenated-aromatic-phosphoric-ester-containing flame retardant includes tris(2,4,6-tribromophenyl)phosphate, tris(2,4-dibromophenyl)phosphate, and tris(4-bromophenyl) phosphate. Specifically, the aromatic-phosphoric-ester-containing flame retardant includes triphenyl phosphate, tris(2,6-xylyl)phosphate, tetrakis(2,6-xylyl) resorcindiphosphate, tetrakis(2,6-xylyl) hydroquinonediphosphate, tetrakis(2,6-xylyl)-4,4'-biphenoldiphosphate, tetraphenylresorcin diphosphate, tetraphenylhydroquinone diphosphate, tetraphenyl-4,4'-biphenol diphosphate, aromatic polyphosphate whose aromatic ring sources are resorcin and phenol and which contains no phenolic OH group, aromatic polyphosphate whose aromatic ring sources are resorcin and phenol and which contains a phenolic OH group, aromatic polyphosphate whose aromatic ring sources are hydroquinone and phenol and which contains no phenolic OH group, similar aromatic polyphosphate containing a phenolic OH group ("aromatic polyphosphate" to be described below includes aromatic polyphosphate containing a phenolic OH group and aromatic polyphosphate containing no phenolic OH group), aromatic polyphosphate whose aromatic ring sources are bisphenol A and phenol, aromatic polyphosphate whose aromatic ring sources are tetrabromobisphenol A and phenol, aromatic polyphosphate whose aromatic ring sources are resorcin and 2,6-xylenol, aromatic polyphosphate whose aromatic ring sources are hydroquinone and 2,6-xylenol, aromatic polyphosphate whose aromatic ring sources are bisphenol A and 2,6-xylenol and aromatic polyphosphate whose aromatic ring sources are tetrabromobisphenol A and 2,6-xylenol.

The polycarbonate resin molding material of the present invention may further contain other resin and an elastomer in such a small amount that the object of the present invention is not impaired.

The above resin includes, for example, polyester resins such as polyethylene terephthalate and polybutyrene terephthalate, a polyamide resin, a polyimide resin, a polyetherimide resin, a polyurethane resin, a silicone resin, a polyphenylene ether resin, a polyphenylenesulfide resin, polysulfone resin, polyolefin resins such as polyethylene and polypropylene, a polystyrene resin, an acrylonitrile/styrene copolymer (AS resin), an acrylonitrile/butadiene/styrene copolymer (ABS resin), a polymethacrylate resin, a phenolic resin and an epoxy resin.

The elastomer includes, for example, isobutylene/isoprene rubber, styrene/butadiene rubber, ethylene/propylene rubber, acrylic elastomer, polyester elastomer, polyamide elastomer, MBS (methyl methacrylate/butadiene/styrene) rubber that is a core-shell type elastomer, and MAS (methyl methacrylate/acrylonitrile/styrene) rubber.

In the polycarbonate resin molding material of the present invention, the polycarbonate resin, the mold release agent (B) composed of the fatty acid ester and the phosphorus-containing heat stabilizer and other additives are blended by any method. For example, a method in which these components are mixed with a tumbler, a V-blender, a super mixer, Nauta Mixer, a Banbury mixer, a kneading roll or an extruder is employed as required. The thus-obtained polycarbonate resin molding material can be formed into a molded article or sheet by a generally known method such as an injection molding method, an extrusion method, a compression molding method or a sheet extrusion method directly or after the polycarbonate resin molding material is once prepared in the form of pellets.

When the mold release agent composed of the fatty acid ester and the phosphorus-containing heat stabilizer and the other additives are incorporated, there may be employed a method in which the additives are directly placed or injected into an extruder or injected into it after melted by heating.

According to the present invention, therefore, there is provided a process for preparing a polycarbonate resin molding material, which comprises the steps of (1) homogeneously mixing 100 parts by weight of a fatty acid ester (b1) with 0.0001 to 50 parts by weight of a phosphorus-containing heat stabilizer (b2), to prepare a mold release agent (B), and (2) mixing 100 parts by weight of a polycarbonate resin (A) with 0.001 to 1.0 part by weight of the mold release agent (B) prepared in said step (1), to prepare the polycarbonate resin molding material.

A preferred embodiment of production of an optical disk from the resin molding material of the present invention will be explained.

As a polycarbonate resin as a raw material, a polycarbonate resin from which impurities and foreign mater have been removed is used. That is, the polycarbonate resin as a raw material is prepared according to a conventionally known method (interfacial polymerization method, melt polymerization method, or the like). Then, preferably, the polycarbonate resin is subjected to alkali extraction or filtering treatment in a solution state, and the raw material after granulation (removal of a solvent) is washed with a polycarbonate poor solvent and a non-solvent selected from ketones such as acetone, an aliphatic hydrocarbon such as hexane or an aromatic hydrocarbon such as xylene, thereby to remove impurities or foreign matter such as a low-molecular-weight component and an unreacted component. Further, in the step of extrusion (pelletization step) for obtaining a polycarbonate resin in the form of pellets to be supplied for injection molding, it is preferred to pass the polycarbonate resin through a sintered metal filter having a filtration accuracy of 10 μm when it is in a molten state, thereby to remove foreign matter. In any case, it is required to decrease the content of foreign matter, impurities and a solvent in the raw material resin before injection molding so as to make the content as small as possible.

When an optical disk substrate is produced from the above polycarbonate resin molding material, an injection molding machine (including an injection compression molding machine) is used. As the above injection molding machine, a general injection molding machine can be used. For suppressing the occurrence of a carbide and increasing the reliability of the disk substrate, however, it is preferred to use an injection molding machine having a cylinder and a screw made of a material whose adhesion to the resin is low and which exhibit anti-corrosion and anti-abrasion properties. Concerning injection molding conditions, preferably, the cylinder temperature is 300 to 400° C., and the mold temperature is 50 to 140° C. Under these conditions, an optically excellent optical disk substrate can be obtained. The environment in which the molding step is carried out is desirably as clean as possible in view of the object of the present invention. Materials to be supplied for the molding are fully dried to remove water, and care is taken not to cause residence that incurs the decomposition of a molten resin, which are also important. Further, it is also important to take care of it into account that a substrate having anything wrong with regard to birefringence and mechanical properties is not used for a product or as a substrate for testing.

When an optical disk substrate formed from the polycarbonate resin molding material of the present invention is held under high-temperature and high-humidity conditions for a long time, the number of fine white spots that occurs thereon is remarkably small, and such an optical disk substrate is excellent as an optical disk substrate for CD-R, CD-RW, MO, a digital video disk, DVD-ROM, DVD-audio, DVD-R and a digital versatile disk (DVD) typified by DVD-RAM, particularly as a substrate for DVD. The above property under the high-temperature and high-humidity conditions can be confirmed by leaving a disk in a constant-temperature and constant-humidity chamber controlled to have a temperature of 80° C. and a relative humidity of 85% for 1,000 hours and inspecting the disk for the number of white spots that occur and have a size of 20 μm or more. In a disk substrate obtained from the polycarbonate resin molding material of the present invention, the number of the white spots that occur on the disk substrate having a diameter of 120 mm is 2 or less, and the number of such spots on a preferred substrate is 1 or less.

The present inventors have made further studies with regard to the above polycarbonate resin molding material of the present invention, and it has been found desirable that a composition containing a polycarbonate resin, a fatty acid ester (mold release agent) and a phosphorus-containing heat stabilizer further contains a specific amount of a free alcohol.

According to the present invention, there is therefore provided a polycarbonate resin molding material comprising (A) 100 parts by weight of a polycarbonate resin, (B) 0.001 to 1.0 part by weight of a mold release agent composed of a fatty acid ester, (C) 0.0001 to 50 parts by weight, per 100 parts by weight of said fatty acid ester, of a phosphorus-containing heat stabilizer (C), and (D) 0.5 to 10 mol %, preferably 1 to 8 mol %, per 100 mol % of said fatty acid ester, of a free alcohol corresponding to an alcohol component forming said fatty acid ester.

The present inventors have made further studies, and it has been found that the fatty acid ester as a mold release agent even in a small amount has excellent mold releasability when a mixture of two fatty acid esters of specific types is used.

According to the present invention, therefore, there is provided a polycarbonate resin molding material comprising (A) 100 parts by weight of a polycarbonate resin, (B) 0.001 to 1.0 part by weight of a mold release agent (B) composed of fatty acid esters and (C) 0.0001 to 50 parts by weight, per 100 parts by weight of said fatty acid esters, of a phosphorus-containing heat stabilizer (C), said fatty acid esters being (i) a mixture of a mono- or diester of glycerin and stearic acid with a mono- or diester of glycerin and palmitic acid or (ii) a mixture of a whole ester of pentaerythritol and stearic acid with a whole ester of pentaerythritol and palmitic acid.

In the above mixture, the stearic ester:palmitic ester amount ratio by weight is preferably 75:25 to 50:50.

EXAMPLES

The present invention will be explained with reference to Examples hereinafter, while the present invention shall not be limited to these Examples.

Examples 1 to 4 and Comparative Examples 1 to 4

(1) Preparation of Mold Release Agent (Preliminary Blending)

Under a nitrogen atmosphere, glycerin monostearate as a fatty acid ester was heated to 110° C. to melt the same, and after it was visually found that the glycerin monostearate had been melted, a predetermined amount of phosphoric acid (Wako-Purechemical Ind./reagent special grade 85% phosphoric acid) as a phosphorus-containing heat stabilizer was added. The mixture was stirred for approximately 10 minutes. The mixture was allowed to cool naturally and then pulverized with a mixer, to give a mold release agent in a powder form.

(2) Pelletization

The phosphoric-acid-added glycerin monostearate prepared in the above (1) in an amount shown in Table 1 was added to 100 parts by weight of a powdery polycarbonate resin ("PC"; viscosity average molecular weight 15,300) obtained from bisphenol A, p-tert-butylphenol (terminal stopper) and phosgene by an interfacial polymerization method, and the mixture was extruded with a 30 mm single-screw extruder in a temperature range of 240 to 270° C. to form a thread, and the thread was pelletized with a cutter.

In Comparative Examples 1 to 4, the mold release agent and phosphoric acid in amounts shown in Table 1 were separately added to a polycarbonate resin, and the mixture was extruded with a 30 mm single-screw extruder in a temperature range of 240 to 270° C. to form a thread, and the thread was pelletized with a cutter.

(3) Formation of Plate and Evaluation Thereof for Heat Resistance

The pellets obtained in the above (2) were injection-molded with an injection molding machine at a molding temperature of 380° C. at a cycle of 1 minute, to form a "plate for measurement of a hue before residence" (70 mm×50 mm×2 mm). Separately, the resin was allowed to reside for 10 minutes in the cylinder and then molded under the same conditions as above, to obtain a "plate for measurement of a hue after residence". Each of the plate before residence and the plate after residence was measured for an L value, an a value and a b value with a Nippon Denshoku color difference meter Z-10001DP, and a hue change (ΔE) was determined on the basis of the following expression. As the ΔE increases, the color becomes poor, which shows that a resin is poor in thermal stability. Table 1 shows the results.

$$\Delta E=[(L_1-L_2)^2+(a_1-a_2)^2+(b_1-b_2)^2]^{1/2}$$

wherein $L_1$, $a_1$ and $b_1$ are an L value, an a value and a b value before residence, and $L_2$, $a_2$ and $b_2$ are an L value, an a value and a b value after residence.

(4) Formation of Cup-shaped Molded Piece and Evaluation of Mold-releasing Load

Each of various kinds of the pellets obtained in the above (2) was injection-molded with a Sumitomo SS75 injection molding machine to form cup-shaped molded pieces, and each molded piece was measured for a thrusting load for releasing it from a mold with a memorizer. Table 1 shows the results.

(5) Formation of Optical Disk Substrate and Long-term Reliability Test Thereof

Each of various kinds of the pellets obtained in the above (2) was molded with a disk molding machine (DISK 3M III, supplied by Sumitomo Heavy Industries, Ltd.) to form optical disk substrates (diameter 120 mm, thickness 1.2 mm). Each of the thus-obtained substrates was left in a constant-temperature and constant-humidity chamber controlled to have a temperature of 80° C. and a relative humidity of 85% for 1,000 hours, and then white spots having a size of at least 20 μm in the substrates were counted. The above procedure was carried out with regard to 25 optical disk substrates for each kind of the pellets, and an average value was determined and used as the number of white spots. Table 1 shows the results.

Example 5

Example 1 was repeated except that the powdery polycarbonate resin in Example 3 was replaced with a powdery polycarbonate resin having a viscosity average molecular weight of 25,000. Table 1 shows the results.

Example 6

Example 3 was repeated except that the glycerin monostearate as a fatty acid ester in Example 3 was replaced with a mixture of glycerin monostearate, glycerin distearate, glycerin monopalmitate and glycerin dipalmitate. Table 1 shows the results.

Example 7

Example 5 was repeated except that the glycerin monostearate as a fatty acid ester was replaced with a mixture of glycerin monostearate, glycerin distearate, glycerin monopalmitate and glycerin dipalmitate, the mixture having a monoester:diester molar ratio of 95:5. Table 1 shows the results.

Example 8

A powdery polycarbonate resin ("PC"; viscosity average molecular weight 15,300) was obtained from bisphenol A, p-tert-butylphenol (terminal stopper) and phosgene by an interfacial polymerization method. Separately, a mold release agent having a glycerin content of 6 mol % per 100 mol % of glycerin monostearate was obtained by preliminarily mixing glycerin monostearate with 0.1 part by weight, per 100 parts by weight of the glycerin monostearate, of phosphoric acid in the same manner as in Example 3. 0.05 Part by weight of the thus-prepared mold release agent was added to 100 parts by weight of the polycarbonate resin in the same manner as in Example 3. The mixture was extruded with a 30 mm single-screw extruder at a temperature in the range of 240 to 270° C. to form a thread, and the thread was pelletized with a cutter. The same evaluations as those in Example 3 were carried out using the above pellets. Table 1 shows the results.

Example 9

Example 3 was repeated except that the glycerin monostearate as a fatty acid ester was replaced with pentaerythritol tetrastearate (Roxyol VPG861, supplied by Henckels Japan). Table 1 shows the results.

Example 10

Tri(2,4-tert-butylphenyl)phosphite (Irgafos-168, supplied by Ciba Specialty Chemicals) in an amount of 50 ppm was further added to the same composition as that in Example 3, and the resultant composition was evaluated for heat resistance during molding to show results similar to the results in Example 3.

Example 11

Tri(2,4-tert-butylphenyl)phosphite (Irgafos-168, supplied by Ciba Specialty Chemicals) in an amount of 50 ppm and 100 ppm of trimethyl phosphate (TMP, supplied by Daihachi Kagaku Kogyo) were further added to the same composition as that in Example 3, and the mixture was pelletized. The pellets were evaluated for heat resistance during molding to show results similar to the results in Example 3.

Example 12

Tetrakis(2,4-di-tert-butylphenyl)4,4'-biphenylene-diphosphonite (P-EPQ, supplied by Clariant Japan) in an amount of 30 ppm was further added to the same composition as that in Example 4, and the mixture was pelletized. The pellets were evaluated for heat resistance during molding to show results similar to the results in Example 4.

Example 13

Tetrakis(2,4-di-tert-butylphenyl)4,4'-biphenylene-diphosphonite (P-EPQ, supplied by Clariant Japan) in an amount of 30 ppm and 100 ppm of trimethyl phosphate (TMP, supplied by Daihachi Kagaku Kogyo) were further added to the same composition as that in Example 4, and the mixture was pelletized. The pellets were evaluated for heat resistance during molding to show results similar to the results in Example 4.

Example 14

Example 3 was repeated except that the glycerin monostearate as a fatty acid ester was replaced with a mixture of glycerin tristearate with stearyl stearate (Rikemarl SL-900, supplied by Riken Vitamin), and the resultant molding material was evaluated for heat resistance during molding in the same manner as in Example 3, to show results similar to the results in Example 3.

Example 15

A mold release agent prepared by preliminarily mixing 0.05 part by weight of glycerin monostearate with 0.1 part by weight, per 100 parts by weight of the glycerin monostearate, of phosphoric acid at 130° C. was added to 100 parts by weight a powdery polycarbonate resin ("PC"; viscosity average molecular weight 15,300) obtained from bisphenol A, p-tert-butylphenol (terminal stopper) and phosgene by an interfacial polymerization method, in the same manner as in Example 1. The mixture was extruded with a 30 mm single-screw extruder at a temperature in the range of 240 to 270° C., to form a thread, and the thread was pelletized with a cutter. The pellets had a glycerin content of 2 mol % per 100 mol % of the glycerin monostearate. The pellets were evaluated in the same manner as in Example 1. Table 2 shows the results.

Example 16

A powdery polycarbonate resin ("PC"; viscosity average molecular weight 15,300) was obtained from bisphenol A, p-tert-butylphenol (terminal stopper) and phosgene by an interfacial polymerization method. 0.05 Part by weight of a mixture containing glycerin monostearate, glycerin distearate, glycerin monopalmitate and glycerin dipalmitate, having a stearic ester:palmitic ester mixing ratio of 70:30 by weight, was preliminarily mixed with 0.1 part by weight, per 100 parts by weight of the fatty acid esters, of phosphoric acid, to prepare a mold release agent. The mold release agent was added to 100 parts by weight of the above polycarbonate resin in the same manner as in Example 1. The mixture was extruded with a 30 mm single-screw extruder at a temperature in the range of 240 to 270° C., to form a thread, and the thread was pelletized with a cutter. The pellets were evaluated in the same manner as in Example 1. Table 2 shows the results.

TABLE 1

|  | Unit | Ex. 1 | C. Ex. 1 | Ex. 2 | C. Ex. 2 | Ex. 3 | C. Ex. 3 |
| --- | --- | --- | --- | --- | --- | --- | --- |
| PC, Viscosity average molecular weight |  | 15,300 | 15,300 | 15,300 | 15,300 | 15,300 | 15,300 |
| Phosphorus-containing heat stabilizer |  | Phosphoric acid | Phosphoric acid | Phosphoric acid | Phosphoric acid | Phosphoric acid | Phosphoric acid |
| Fatty acid ester |  | Glycerin monostearate | Glycerin monostearate | Glycerin monostearate | Glycerin monostearate | Glycerin monostearate | Glycerin monostearate |
| Amount of phosphorus-containing heat stabilizer per 100 parts by weight of fatty acid ester | Part by weight | 0.01 | 0.01 | 0.1 | 0.1 | 0.1 | 0.1 |
| Method of adding phosphorus-containing heat stabilizer |  | Pre-mixing | Separate mixing | Pre-mixing | Separate mixing | Pre-mixing | Separate mixing |
| Amount of (fatty acid ester + phosphorus-containing heat stabilizer) per 100 parts by weight of PC | Part by weight | 0.1 | 0.1 | 0.075 | 0.075 | 0.05 | 0.05 |
| Amount of phosphorus-containing heat stabilizer based on the entire composition | ppm | 0.1 | 0.1 | 0.75 | 0.75 | 0.5 | 0.5 |
| Load for releasing | N | 490 | 500 | 580 | 575 | 680 | 690 |
| Change in hue ($\Delta E$) after residence |  | 6.54 | 8.10 | 4.22 | 4.98 | 1.66 | 1.96 |
| Number of white spots | Number/disk | 0.8 | 0.9 | 0.6 | 0.9 | 0.3 | 0.7 |

|  | Unit | Ex. 4 | C. Ex. 4 | Ex. 5 | Ex. 6 | Ex. 7 | Ex. 8 | Ex. 9 |
| --- | --- | --- | --- | --- | --- | --- | --- | --- |
| PC, Viscosity average molecular weight |  | 15,300 | 15,300 | 25,000 | 15,300 | 15,300 | 15,300 | 15,300 |
| Phosphorus-containing heat stabilizer |  | Phosphoric acid | Phosphoric acid | Phosphoric acid | Phosphoric acid | Phosphoric acid | Phosphoric acid | Phosphoric acid |
| Fatty acid ester |  | Glycerin monostearate | Glycerin monostearate | Glycerin monostearate | Mixture *1 | Mixture *2 | Glycerin monostearate | Pentaerythritol tetrastearate |
| Amount of phosphorus-containing heat stabilizer | Part by weight | 1 | 1 | 0.1 | 0.1 | 0.1 | 0.1 | 0.1 |

TABLE 1-continued

|  |  |  |  |  |  |  |  |  |
|---|---|---|---|---|---|---|---|---|
| per 100 parts by weight of fatty acid ester |  |  |  |  |  |  |  |  |
| Method of adding phosphorus-containing heat stabilizer |  | Pre-mixing | Separate mixing | Pre-mixing | Pre-mixing | Pre-mixing | Pre-mixing | Pre-mixing |
| Amount of (fatty acid ester + phosphorus-containing heat stabilizer) per 100 parts by weight of PC | Part by weight | 0.02 | 0.02 | 0.05 | 0.05 | 0.05 | 0.05 | 0.05 |
| Amount of phosphorus-containing heat stabilizer based on the entire composition | ppm | 2 | 2 | 0.5 | 0.5 | 0.5 | 0.5 | 0.5 |
| Load for releasing | N | 890 | 880 | 680 | 680 | 680 | 680 | 700 |
| Change in hue (ΔE) after residence |  | 0.46 | 0.66 | 1.69 | 1.68 | 1.69 | 1.65 | 1.70 |
| Number of white spots | Number/disk | 0 | 0.2 | — | 0.3 | 0.4 | 0.3 | 0.4 |

Ex. = Example,
C. Ex. = Comparative Example
*1 Mixture of glycerin monosterate, glycerin distearate, glycerin monopalmitate and glycerin dipalmitate
*2 Mixture of glycerin monosterate, glycerin distearate, glycerin monopalmitate and glycerin dipalmitate, having a monoester: diester molar ratio of 95:5

TABLE 2

|  | Unit | Ex. 15 | Ex. 16 |
|---|---|---|---|
| PC, Viscosity average molecular weight |  | 15,300 | 15,300 |
| Phosphorus-containing heat stabilizer |  | Phosphoric acid | Phosphoric acid |
| Fatty acid ester |  | Glycerin monostearate | Mixture*1 |
| Amount of phosphorus-containing heat stabilizer per 100 parts by weight of fatty acid ester | Part by weight | 0.1 | 0.1 |
| Method of adding phosphorus-containing heat stabilizer |  | Pre-mixing | Pre-mixing |
| Amount of (fatty acid ester + phosphorus-containing heat stabilizer) per 100 parts by weight of PC | Part by weight | 0.05 | 0.05 |
| Amount of phosphorus-containing heat stabilizer based on the entire composition | ppm | 0.5 | 0.5 |
| Load for releasing | N | 680 | 6901 |
| Change in hue (Δ E) after residence |  | 1.67 | 1.69 |
| Number of white spots | Number/disk | 0.3 | 0.4 |

Ex. = Example,
C. Ex. = Comparative Example
*1Mixture of glycerin monosterate, glycerin distearate, glycerin monopalmitate and glycerin dipalmitate, having a stearic ester: palmitic ester weight ratio of 70:30

What is claimed is:

1. A polycarbonate resin molding material comprising (A) 100 parts by weight of a polycarbonate resin having a viscosity average molecular weight of 10,000 to 50,000, and 0.001 to 1.0 part by weight of a mold release agent (B) comprising a fatty acid ester and a phosphorus-containing heat stabilizer, the mold release agent (B) containing 0.0001 to 50 parts by weight, per 100 parts by weight of the fatty acid ester (b1), of the phosphorus-containing heat stabilizer (b2).

2. The polycarbonate resin molding material of claim 1, wherein the fatty acid ester (b1) is a partial ester or a whole ester of a monohydric alcohol and/or a polyhydric alcohol and a fatty acid, represented by the following formula (1),

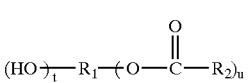

(1)

wherein $R_1$ is an aliphatic hydrocarbon group having a valence of (t+u) and having 1 to 22 carbon atoms, $R_2$ is an alkyl group having 12 to 22 carbon atoms, t is 0 or a positive integer, and u is a positive integer, provided that (t+u) is an integer of 1 to 6.

3. The polycarbonate resin molding material of claim 1, wherein the phosphorus-containing heat stabilizer (b2) is at least one selected from the group consisting of phosphoric acid, a phosphorous acid, esters of these and condensates of these.

4. The polycarbonate resin molding material of claim 1, wherein the phosphorus-containing heat stabilizer (b2) is at least one selected from the group consisting of compounds of the following formulae (2) to (6),

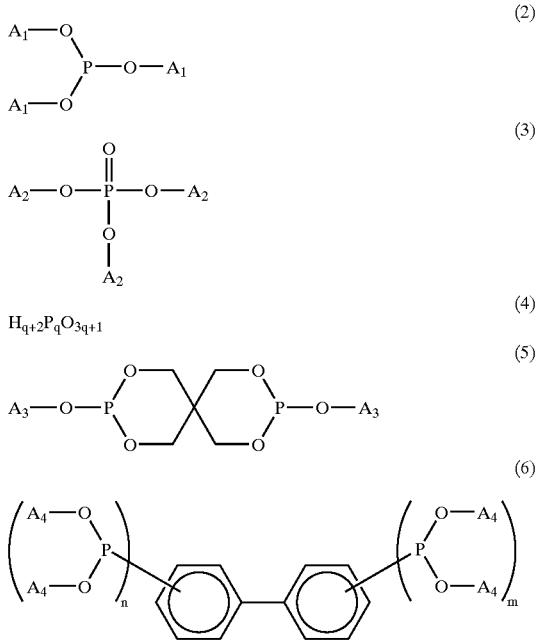

wherein each of a plurality of $A_1$s, each of a plurality of $A_2$s, each of a plurality of $A_3$s or each of a plurality of $A_4$ is independently a group selected from the class consisting of an alkyl group having 1 to 20 carbon atoms, a phenyl group, a phenylalkyl group (whose alkyl portion has 1 to 9 carbon atoms) and an alkylphenyl group (whose alkyl portion has 1 to 9 carbon atoms), each of $A_1$s or each of $A_2$s can be independently a hydrogen atom, q in the formula (4) is an integer of 2 to 6, and each of m and n in the formula (6) is independently an integer of 0 to 2, provided that (m+n) is 1 or 2.

5. The polycarbonate resin molding material of claim 1, wherein the mold release agent (B) is constituted by homogeneously mixing the fatty acid ester (b1) and the phosphorus-containing heat stabilizer (b2).

6. The polycarbonate resin molding material of claim 1, wherein the mold release agent (B) is a product prepared by mixing the fatty acid ester (b1) and the phosphorus-containing heat stabilizer (b2) under a condition where at least one of (b1) and (b2) is melted.

7. The polycarbonate resin molding material of claim 1, wherein the mold release agent (B) contains 0.5 to 10 mol % of a free monohydric alcohol and/or a free polyhydric alcohol per 100 mol % of a monohydric alcohol and/or a polyhydric alcohol forming the fatty acid ester (b1).

8. The polycarbonate resin molding material of claim 1, wherein the fatty acid ester (b1) is an ester formed from a polyhydric alcohol having 3 or 4 hydroxyl groups and having 3 to 5 carbon atoms and an aliphatic monocarboxylic acid having 14 to 20 carbon atoms.

9. The polycarbonate resin molding material of claim 1, wherein the fatty acid ester (b1) is mono- or diester of glycerin and stearic acid or palmitic acid or a whole ester of pentaerythritol and stearic acid or palmitic acid.

10. The polycarbonate resin molding material of claim 1, wherein the fatty acid ester (b1) is an ester of glycerin and stearic acid or palmitic acid, said ester being a mixture of a monoester and a diester, the mixture having a monoester:diester molar ratio of 99:1 to 90:10.

11. The polycarbonate resin molding material of claim 1, wherein the phosphorus-containing heat stabilizer (b2) is at least one selected from the group consisting of a mixture of tetrakis(2,4-di-tert-butylphenyl)4,4'-biphenylene-diphosphonite, tetrakis(2,4-di-tert-butylphenyl)4,3'-biphenylenediphosphonite and tetrakis(2,4-di-tert-butylphenyl)3,3-biphenylene-diphosphonite, phosphoric acid, phosphorous acid, trimethyl phosphate, (2,4-di-tert-butylphenyl)phosphite and trisnonylphenyl phosphite.

12. The polycarbonate resin molding material of claim 1, which contains, per 100 parts by weight of the polycarbonate resin, 0.01 to 0.6 part by weight of the mold release agent (B).

13. The polycarbonate resin molding material of claim 1, wherein the mold release agent (B) contains, per 100 parts by weight of the fatty acid ester (b1), 0.005 to 3 parts by weight of the phosphorus-containing heat stabilizer (b2).

14. A process for the preparation of a polycarbonate resin molding material, which comprises
(1) homogeneously mixing 100 parts by weight of a fatty acid ester (b1) with 0.0001 to 50 parts by weight of a phosphorus-containing heat stabilizer (b2), to prepare a mold release agent (B), and
(2) mixing 100 parts by weight of a polycarbonate resin (A) having a viscosity average molecular weight of 10,000 to 50,000, with 0.001 to 1.0 part by weight of the mold release agent (B), to prepare the polycarbonate resin molding material.

15. A polycarbonate resin molded article formed from the polycarbonate resin molding material recited in claim 1.

16. An optical disk substrate formed of the polycarbonate resin molding material recited in claim 1.

17. A polycarbonate resin molding material comprising (A) 100 parts by weight of a polycarbonate resin, (B) 0.001 to 1.0 part by weight of a mold release agent comprising a fatty acid ester, (C) 0.0001 to 50 parts by weight, per 100 parts by weight of said fatty acid ester, of a phosphorus-containing heat stabilizer, and (D) 0.5 to 10 mol %, per 100 mol % of said fatty acid ester, of a free alcohol corresponding to an alcohol component forming said fatty acid ester.

18. A polycarbonate resin molding material comprising (A) 100 parts by weight of a polycarbonate resin, (B) 0.001 to 1.0 part by weight of a mold release agent comprising fatty acid esters and (C) 0.0001 to 50 parts by weight, per 100 parts by weight of said fatty acid esters, of a phosphorus-containing heat stabilizer, said fatty acid esters being (i) a mixture of a mono- or diester of glycerin and stearic acid with a mono- or diester of glycerin and palmitic acid or (ii) a mixture of a whole ester of pentaerythritol and stearic acid with a whole ester of pentaerythritol and palmitic acid.

19. The polycarbonate resin molding material of claim 18, wherein the mixture has a stearic ester:palmitic ester amount ratio of 75:25 to 50:50 by weight.

20. A polycarbonate resin molding material comprising (A) 100 parts by weight of a polycarbonate resin and 0.001 to 1.0 part by weight of a mold release agent (B) comprising a fatty acid ester and a phosphorus-containing heat stabilizer, the mold release agent (B) containing 0.000 1 to 50 parts by weight, per 100 parts by weight of the fatty acid ester (b1), of the phosphorus-containing heat stabilizer (b2), and the mold release agent (B) containing 0.5 to 10 mol % of a free monohydric alcohol and/or a free polyhydric alcohol per 100 mol % of a monohydric alcohol and/or a polyhydric alcohol forming the fatty acid ester (b1).

* * * * *